US009637675B2

(12) United States Patent
Brannon et al.

(10) Patent No.: US 9,637,675 B2
(45) Date of Patent: May 2, 2017

(54) USE OF COMPOSITES HAVING DEFORMABLE CORE AND VISCOSIFYING AGENT COATED THEREON IN WELL TREATMENT OPERATIONS

(75) Inventors: Harold Dean Brannon, Magnolia, TX (US); Harold Gene Hudson, The Woodlands, TX (US); Windal Scott Bray, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 1130 days.

(21) Appl. No.: 13/302,816

(22) Filed: Nov. 22, 2011

(65) Prior Publication Data

US 2013/0130947 A1 May 23, 2013

(51) Int. Cl.
*C09K 8/68* (2006.01)
*C09K 8/516* (2006.01)

(52) U.S. Cl.
CPC .................................... *C09K 8/516* (2013.01)

(58) Field of Classification Search
CPC ......................................................... C09K 8/68
See application file for complete search history.

(56) References Cited

U.S. PATENT DOCUMENTS

| | | | |
|---|---|---|---|
| 4,021,355 | A | 5/1977 | Holtmyer et al. |
| 4,191,249 | A | 3/1980 | Sarem |
| 4,202,795 | A | 5/1980 | Burnham et al. |
| 5,253,711 | A | 10/1993 | Mondshine |
| 5,311,946 | A | 5/1994 | Harry et al. |
| 5,422,183 | A | 6/1995 | Sinclair et al. |
| 5,547,026 | A | 8/1996 | Brannon et al. |
| 5,699,860 | A | 12/1997 | Grundmann |
| 6,059,034 | A | 5/2000 | Rickards et al. |
| 6,330,916 | B1 | 12/2001 | Rickards et al. |
| 6,364,018 | B1 | 4/2002 | Brannon et al. |
| 6,749,025 | B1 | 6/2004 | Brannon et al. |
| 6,772,838 | B2 | 8/2004 | Dawson et al. |
| 7,207,386 | B2 | 4/2007 | Brannon et al. |
| 7,290,614 | B2 | 11/2007 | Smith et al. |
| 7,322,411 | B2 | 1/2008 | Brannon et al. |
| 7,426,961 | B2 | 9/2008 | Stephenson et al. |
| 7,491,682 | B2 | 2/2009 | Gupta et al. |
| 7,493,955 | B2 | 2/2009 | Gupta et al. |
| 7,584,791 | B2 | 9/2009 | Robb et al. |
| 7,598,209 | B2 | 10/2009 | Kaufman et al. |
| 7,735,556 | B2 | 6/2010 | Misselbrook et al. |
| 7,772,163 | B1 | 8/2010 | Brannon et al. |
| 7,913,762 | B2 | 3/2011 | Wheeler et al. |
| 7,971,643 | B2 * | 7/2011 | Brannon ............... C09K 8/62 166/280.1 |
| 8,899,332 | B2 | 12/2014 | Brannon et al. |
| 2005/0194135 | A1 | 9/2005 | Nguyen et al. |
| 2005/0194141 | A1 | 9/2005 | Sinclair et al. |
| 2005/0288190 | A1 | 12/2005 | Dao et al. |
| 2006/0003900 | A1 * | 1/2006 | Hanes, Jr. .................... 507/203 |
| 2008/0078547 | A1 | 4/2008 | Sinclair et al. |
| 2008/0182761 | A1 | 7/2008 | Stephenson et al. |
| 2009/0149353 | A1 * | 6/2009 | Dajani et al. .................. 507/216 |
| 2009/0149354 | A1 | 6/2009 | Dajani et al. |
| 2009/0205824 | A1 * | 8/2009 | Sullivan et al. ............... 166/278 |
| 2010/0147515 | A1 * | 6/2010 | Hughes et al. ................ 166/271 |
| 2011/0028354 | A1 | 2/2011 | Le et al. |
| 2011/0146996 | A1 | 6/2011 | Bell et al. |
| 2011/0220363 | A1 | 9/2011 | Gupta |

OTHER PUBLICATIONS

Miswaco, Guar Gum, 2006.*
Kureha, Polyglycolic Acid (PGA) resin, Sep. 2010.*
Steiner, William H.; U.S. Appl. No. 13/076,304 entitled "Well Treatment Composites for Use in Well Treatment Fluids" filed Mar. 30, 2011.
Gupta, D.V. Satyanarayana; U.S. Appl. No. 13/094,186 entitled "Composites for Controlled Release of Well Treatment Agents" filed Apr. 26, 2011.
Darby, et al.; U.S. Appl. No. 12/839,047 "Shaped Compressed Pellets for Slow Release of Well Treatment Agents into a Well and Methods of Using the Same" filed Jul. 19, 2010.
Casey, et al.; U.S. Appl. No. 12/954,413 entitled "Method of Using Gelled Fluids with Defined Specific Gravity" filed Nov. 24, 2010.
U.S. Appl. No. 13/076,304, filed Mar. 30, 2011, Steiner.
U.S. Appl. No. 13/094,186, filed Apr. 26, 2011, Gupta.
U.S. Appl. No. 12/839,047, filed Jul. 19, 2010, Darby, et al.
U.S. Appl. No. 12/954,413, filed Nov. 24, 2010, Casey, et al.
Scale Removal and Control, Halliburton Services; Sep. 28, 1993.
Technical Data Sheet SCP-2, Halliburton Co.; Oct. 1960.
Technical Data Sheet SCP-2; Halliburton Services.
SinterBall Bauxite MSDS, Mineracao Curimbaba Ltda.; Sep. 28, 1998.
Sand MSDS, Fritz Industries, Inc.; Nov. 4, 2008.
LiteProp 125 MSDS, Fritz Industries, Inc.; Jul. 17, 2008.
Crosslinker XE 137 MSDS, Schlumberger; May 25, 2007.
FBP-34 Welan Gum MSDS, Fritz Industries, Inc.; Jul. 6, 2006.
Beijing Ranger Chem SM-828, Beijing Ranger Chemical Co.; Dec. 1, 2009.
PVP-K-30 MSDS, GAF Chemicals Corporation; Jul. 1990 polyvinylpyrrolidone.

* cited by examiner

*Primary Examiner* — Jeffrey Washville
(74) *Attorney, Agent, or Firm* — John Wilson Jones; Jones Delflache LLP

(57) ABSTRACT

Loss of wellbore fluids (such as drilling fluids, completion fluids and workover fluids) into the flow passages of a subterranean formation may be reduced or eliminated by introducing into the wellbore in communication with the formation a composition containing a composite of a deformable core having a hardened coating which contains a viscosifying agent and, optionally, a crosslinking agent. The viscosity of the composition increases in-situ as the viscosifying agent, and optional crosslinking agent, disassociate from the deformable core and react. A fluid-impermeable barrier is thereby formed. The composites may also be used in spacers, well cements, workover and completion fluids as their need arises.

30 Claims, No Drawings

USE OF COMPOSITES HAVING DEFORMABLE CORE AND VISCOSIFYING AGENT COATED THEREON IN WELL TREATMENT OPERATIONS

FIELD OF THE INVENTION

The invention relates to methods of using a well treatment composition in order to create a barrier to the flow of fluids in a wellbore or in a subterranean formation penetrated by an oil, gas or geothermal well. The invention further relates to a method of using the composition to prevent loss of wellbore fluids into flow passages of a subterranean formation during well drilling, cementing, completion and workover operations.

BACKGROUND OF THE INVENTION

A common problem in the oil field is the loss of circulation of special fluids, such as drilling, cementing, completion and workover fluids, into highly permeable zones of the subterranean formation or into the wellbore. Loss of wellbore fluids into the formation or wellbore can dramatically increase the costs of such operations. Such increased costs may be attributable to damage to the drill bit caused by overheating, a decrease in the drilling rate, blowout due to a drop in fluid level in the well, zonal isolation failure due to insufficient cement filling and requisite remedial operations. In some instances, loss circulation fluids may cause the collapse of the formation at the wellbore as well as in-depth plugging of the formation. This, in turn, may cause such extensive damage that the reservoir may have to be abandoned.

In order to stop or retard the flow of undesirable fluids into the formation, it is desirable to form a barrier in the formation. Such barriers plug the passages responsible for fluid flow. Often, lost circulation materials (LCMs) which are capable of bridging or blocking seepage into the formation are added to the fluid. While cements and silicates are frequently used as LCMs, the flow properties of such fluids often do not achieve effective plugging. For instance, the large particle size of cements often prevents LCM compositions containing cement from penetrating much beyond a few centimeters into low flow rate channels. Alternatives are desired which will allow LCM compositions to penetrate further distances into such channels.

Further, when cements are used in high flow rate channels, the set time of the cement, in relation to the flow rate, often prevents stoppage of the loss of circulation. Barrier plugs having cement as LCMs are thus frequently ineffective to the influx of wellbore fluids. More effective methods for reducing the loss of wellbore fluids into flow passages of the formation, as well as in the wellbore, during well treatment operations, such as during drilling, cementing, completion or workover of the well are therefore desired.

SUMMARY OF THE INVENTION

Well treatment composites used in the well treatment fluids described herein are characterized by a deformable core particulate coated with one or more viscosifying agents on the deformable core for gellation of the well treatment fluids.

The deformable core may be lightweight having an apparent specific gravity (ASG) less than or equal to 2.45, though heavier deformable materials may also be used.

In those instances where crosslinking of the viscosifying agent is desirable, the crosslinking agent and, optionally, a crosslinking delaying agent, may also be coated (as a hardened mass) onto the deformable core.

The use of the coated deformable core described herein renders it unnecessary to separately ship core particulate, viscosifying agent, crosslinking agent, crosslinking delaying agent and other additives to a remote location. In addition, less platform space is needed on site to perform the well treatment operation since less space is needed for formulating the well treatment fluid.

On the platform, the well treatment fluid is prepared by simply adding a carrier fluid to the well treatment composite. Suitable carrier fluids include salt water, fresh water and slickwater. The well treatment composite is preferably substantially neutrally buoyant in the carrier fluid. The carrier fluid may be a completion brine, drilling fluid or a well cement.

After being introduced into the wellbore and, upon exposure to environmental conditions such as pH and elevated temperatures, the viscosifying agent (and optionally crosslinking agent, crosslinking delaying agent and other additives) disassociate from the deformable core. The viscosity of the well treatment fluid increases after the fluid is introduced into the wellbore and after the viscosifying agent begins to disassociate from the deformable core. In a similar manner, the crosslinking agent, crosslinking delay agent, and other additives disassociate from the deformable core. As such, they become active components of the well treatment fluid after the treatment fluid has been introduced into the wellbore.

Agglomeration of the deformable core particulates downhole forms a barrier or highly viscous plug in the targeted area of the subterranean formation and/or wellbore. As such, use of the well treatment composites described herein provides the ability of LCM compositions to penetrate greater distances into the well and/or formation.

The plug may form a fluid-impermeable barrier in the formation. For instance, the barrier may be formed in flow passages such as fractures, vugs, or high permeability zones within the formation. The barrier or plug may also form in the wellbore and/or in the formation.

Since the well treatment composition, subsequent to being introduced into the wellbore, is able to effectively form a barrier or plug, the composite defined herein is particularly efficacious in reducing the loss of wellbore fluids (such as drilling fluids, completion fluids and workover fluids) in the wellbore and/or into the flow passages of a formation during well drilling, completion and workover operations.

Typically, the well treatment composition is pumped into the wellbore and/or formation as a pill and allowed to viscosify prior to re-starting of the drilling, completion or workover operation when the viscosifying agent disassociates from the deformable core.

DETAILED DESCRIPTION OF THE PREFERRED EMBODIMENTS

The well treatment composition described herein contains a composite composed of a deformable core having one or more gelling (or viscosifying) agents coated on the deformable core. The composite is effective in stopping or minimizing passage of undesired wellbore fluids into a subterranean formation or into a wellbore by the creation of a plug or barrier in or across a flow path in the formation. The plug or barrier reduces or eliminates the loss of wellbore fluid into the wellbore and/or the subterranean formation.

In addition to the viscosifying agent, other materials may also be hardened onto the deformable core. For instance, where the viscosifying agent is crosslinkable, a crosslinking agent and/or crosslinking delaying agent may also be hardened onto the deformable core.

The deformable core may be non-porous or porous. Preferred are porous deformable core particulates composed of non-microbial polysaccharides.

Since the core is deformable, the core particulate substantially yields upon application of a minimum threshold level to point to point stress at in situ conditions. As such, the deformable core for use in the invention is capable of being used in crevices and small areas and of deforming to plaster voids in the reservoir. Further, the deformable cores for use in the invention do not shatter or break at elevated downhole stresses. The deformable cores for use in the method of the invention may therefore be selected to function in low to moderate stress environments (100 psi to 5,000 psi) as well as moderate to high stress environments (5,000 psi to 15,000 psi).

Preferred deformable cores include those relatively lightweight particulates having an apparent specific gravity (ASG) (API RP 60) less than 2.65. In a preferred embodiment, the relatively lightweight particulates are ultra lightweight (ULW) having an ASG less than or equal to 2.45. Even more preferred are those ULW particulates having an ASG less than or equal to 2.25, preferably less than or equal to 2.0, more preferably less than or equal to 1.75, even more preferably less than or equal to 1.5, most preferably less than or equal to 1.25.

Suitable deformable particulates include naturally occurring materials, such as (a.) chipped, ground or crushed shells of nuts such as walnut, pecan, coconut, almond, ivory nut, brazil nut, etc.; (b.) chipped, ground or crushed seed shells (including fruit pits) of seeds of fruits such as plum, olive, peach, cherry, apricot, etc.; (c.) chipped, ground or crushed seed shells of other plants such as maize (e.g., corn cobs or corn kernels), etc.; and (d.) processed wood materials such as those derived from woods such as oak, hickory, walnut, poplar, mahogany, etc.

An optional protective or hardened material on the deformable core may act to harden and/or isolate or protect the deformable core from adverse formation or wellbore conditions. The protective or hardened material may coat the deformable core entirely or may coat only a portion of the deformable core. The protective or hardened material layer may protect the deformable core from exposure to acids or other workover/drilling fluids, to avoid saturation with liquids, etc. In this regard, any coating material suitable for at least partially protecting or isolating the deformable core may be employed. Examples of such hardening and/or protective materials include, but are not limited to resins like urethanes, phenol formaldehyde resins, melamine formaldehyde resins and urethane resins, low volatile urethane resins), etc. and mixtures thereof.

Methods acceptable for the coating of the deformable core are known in the art. For example, low temperature curing methods may be employed (e.g., using fast setting "cold set" or "cold cure" resins), where heating may be a problem, such as when coating materials which may be sensitive to heat, like ground nuts or fruit pits. Alternatively, indirect heating processes may be employed with such materials when it is necessary to heat a coating material for cure. Low temperature curing resins may be applied with little or no heat, which may be desirable when coating heat-sensitive materials such as wood, nut shell material, etc. Alternatively, heat cured resins may be applied and cured using heating methods that are compatible with heat sensitive materials.

Deformable cores may further include such copolymers as polystyrene divinylbenzene terpolymers (including polystyrene/vinyl/divinyl benzene) and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane and mixtures thereof.

The deformable core may further be a multitude of well treatment aggregates agglomerated, bonded or fused together. Included are well treating aggregates composed of an organic lightweight material and a weight modifying agent. The ASG of the organic lightweight material is either greater than or less than the ASG of the well treating aggregate depending on if the weight modifying agent is a weighting agent or weight reducing agent, respectively. Exemplary of such preferred cores are set forth in U.S. Pat. No. 7,322,411, herein incorporated by reference. The ASG of the well treating aggregate is generally less than or equal to 2.0, preferably less than or equal to 1.5, to meet the pumping and/or downhole formation conditions of a particular application, such as hydraulic fracturing treatment, sand control treatment.

The particle size of the deformable cores is that sufficient for the core to fill the voids in the reservoir (such as high porosity streaks, fractures, etc.) through which fluids are typically lost. Typically, the particle size of the deformable cores is between from about 4 mesh (0.1870 inches) to about 500 mesh (0.001 inches), more typically between from about 10 mesh (0.787 inches) to about 325 mesh (0.0017 inches).

The viscosifying agent coated onto the deformable core may include anionic and nonionic polysaccharides, polyvinyl alcohols, polyacrylates, polyacrylamides and mixtures thereof.

Exemplary of such viscosifying agents are such non-crosslinkable cellulose derivatives as alkyl celluloses, hydroxyalkyl cellulose and alkylhydroxyalkyl cellulose, such as hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose and ethylhydroxyethyl cellulose.

Exemplary crosslinkable viscosifying agents include carboxyalkyl cellulose and carboxyalkylhydroxyalkyl cellulose derivatives such as carboxyethylcellulose, carboxymethylcellulose and carboxymethylhydroxyethyl cellulose. Also included are galactomannan gums, such as include non-derivatized guar and derivatized guars like hydroxyalkyl guar and carboxyalkylhydroxyalkyl guar, we well as microbial polysaccharides include xanthan, succinoglycan and scleroglucan. Preferred amongst this group are hydroxypropyl guar and carboxymethylhydroxypropyl guar.

Other suitable viscosifying agents are welan and homo-, block or random polymers containing vinyl alcohol, acrylate, pyrrolidone, 2-acrylamido-2-methylpropane sulfonate, or acrylamide units.

The viscosifying agent may further be a viscoelastic surfactant including non-polymeric viscoelastic surfactants such as the combination of an anionic surfactant (like sodium xylene sulfonate) and a cationic surfactant (like N,N,N-trimethyl-1-octadecammonium chloride).

Generally, the amount of viscosifying agent coated onto the deformable core is between from about 0.1 to about 5 wt %, preferably about 0.5 to about 4 weight %, based on the total weight of deformable core and viscosifying agent.

In addition to the viscosifying agent, a crosslinking agent may be coated onto the deformable core. When present, the crosslinking agent is preferably one which exhibits a delayed reaction with the viscosifying agent until the well treatment composition is within the proximity of the targeted area.

Suitable crosslinking agents include a borate ion releasing compound, an organometallic or organic complexed metal ion comprising at least one transition metal or alkaline earth metal ion as well as mixtures thereof. Where the viscosifying agent is guar or hydroxypropyl guar, a borate ion releasing crosslinking agent is preferred.

Typically, the amount of crosslinking agent coated onto the deformable core is between from about 0.001 percent to about 2 percent, preferably from about 0.005 percent to about 1.5 percent, and, most preferably, from about 0.01 percent to about 1.0 percent, based on the total weight of the deformable core, viscosifying agent and crosslinking agent.

Borate ion releasing compounds which can be employed include, for example, any boron compound which will supply borate ions in the fluid upon disassociation from the deformable core. Such compounds include boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. Mixtures of any of the referenced borate ion releasing compounds may further be employed. Such borate-releasers typically require a basic pH (e.g., 8.0 to 12) for crosslinking to occur.

Further preferred crosslinking agents are those, such as organometallic and organic complexed metal compounds, which can supply trivalent or higher polyvalent metal ions into the fluid upon their disassociation from the deformable core. Examples of the trivalent or higher polyvalent metal ions include boron, titanium, zirconium, aluminum, yttrium, cerium, etc. or a mixture thereof. Examples of titanium compounds include titanium ammonium lactate, titanium triethanolamine, titanium acetylacetonate, titanium diisopropoxide bisacetyl aminate, titanium tetra(2-ethyl hexoxide), titanium tetraisopropoxide, titanium di(n-butoxy) bis-triethanol aminate, titanium isopropoxyoctylene glycolate, titanium diisopropoxy bistriethanol aminate and titanium chloride. Examples of zirconium salts include zirconium ammonium carbonate, zirconium carbonate, zirconium acetylacetonate, zirconium diisopropylamine lactate, zirconium chloride, zirconium lactate, zirconium lactate triethanolamine, zirconium oxyacetate, zirconium acetate, zirconium oxynitrate, zirconium sulfate, tetrabutoxyzirconium (butyl zirconate), zirconium mono(acetylacetonate), zirconium n-butyrate and zirconium n-propylate. The crosslinking agent may optionally be encapsulated. Examples of typical crosslinking agents include, but are not limited to, those described in U.S. Pat. No. 4,514,309 and U.S. Pat. No. 5,247,995, which are incorporated herein by reference.

In addition, a crosslinking or viscosification delaying agent may be coated onto the deformable core in order to control, along with the crosslinking agent, viscosification of the well treatment fluid. Suitable delayed viscosification agents include salts, such as potassium chloride, sodium chloride and calcium chloride. Further suitable crosslinking or viscosification delaying agents include organic polyols, such as sodium gluconate; sodium glucoheptonate, sorbitol, mannitol, phosphonates, bicarbonate salt, salts, various inorganic and weak organic acids including aminocarboxylic acids and their salts (EDTA, DTPA, etc.) and citric acid and mixtures thereof. Such delaying agents are capable of delaying viscosification of the well treatment composition as a gel until the downhole temperature is reached which causes the reaction between the viscosifying agent and crosslinking agent. At that point, substantial viscosification of the well treatment composition results.

Typically, the amount of crosslinking delaying agent coated onto the deformable core is between from about 0.001 percent to about 2 percent based on the total weight of the deformable core and viscosifying agent.

Other additives may also be coated and hardened onto the deformable core. For instance, a base to assist in stabilization of crosslinking may also be hardened onto the deformable core. Suitable stabilizers include those conventionally employed in the art, such as an encapsulated base or in-situ base fluids. Exemplary stabilizers may include, but are not limited, to alkali halides, ammonium halides, potassium fluoride, dibasic alkali phosphates, tribasic alkali phosphates, ammonium fluoride, tribasic ammonium phosphates, dibasic ammonium phosphates, ammonium bifluoride, sodium fluoride, triethanolamine, alkali silicates and alkali carbonates.

Buffering agents may also be adhered to the deformable core in order to maintain the desired pH of the fluid since, in some instances, when the pH of the fluid is too low, degradation of the viscosifying agent may occur. Typical examples of buffering agents include, but are not limited to: sodium phosphate, sodium hydrogen phosphate, boric acid-sodium hydroxide, citric acid-sodium hydroxide, boric acid-borax, sodium bicarbonate, ammonium salts, sodium salts like sodium chloride, potassium salts like potassium chloride, dibasic phosphate, tribasic phosphate, lime, slaked lime, magnesium oxide, magnesium chloride, calcium chloride, basic magnesium carbonate, calcium oxide and zinc oxide.

Similarly, biocides, surfactants and corrosion inhibitors designed to prevent emulsion with formation fluids, to reduce surface tension, to enhance load recovery may be hardened onto the deformable core. Further, one or more treatment additives used to control fines or clay swelling or migration such as clay substitutes of the type based on tetramethylammonium chloride, or potassium chloride or polycationic clay control additives, may be hardened onto the deformable core.

Further, a breaker, capable of reducing the viscosity of the gelled fluid in-situ, may further be coated onto the deformable core. Such breakers allow the fluid to be easily and effectively removed from the formation and to allow desired material, such as oil or gas, to flow into the wellbore. Such breakers include mild oxidizing agents such as persulfates, percarbonates, perborates, peroxides, perphosphates, permanganates, etc. such as alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate. Additional suitable breaking agents are disclosed in U.S. Pat. Nos. 5,877,127; 5,649,596; 5,669,447; 5,624,886; 5,106,5 6,162,766; and 5,807,812. In addition, enzymatic breakers may also be used. Examples of suitable enzymatic breakers such as guar specific enzymes, alpha and beta amylases, amyloglucosidase, oligoglucosidase, invertase, maltase, cellulase, and hemi-cellulase are disclosed in U.S. Pat. Nos. 5,806,597 and 5,067,566.

When present, the amount of additives referenced above which may be coated onto the deformable core is no greater than from about 0.001 percent to about 2 percent based on the total weight of the deformable core and viscosifying agent.

The crosslinking agent and viscosifying agent, as well as other components desired to be coated onto the deformable core, may be deposited onto the deformable core by being sprayed onto the deformable core and then drying the coated core at a temperature above the boiling point of the coated material(s) but below the decomposition temperature of the viscosifying agent.

Preferably, coating of the deformable core occurs in a fluidized bed where conditions may be attained to drive off water and other volatile liquids. The deformable core is placed in the bottom of the bed which is perforated and which contains an entry port for the introduction of air or gas. As air or gas is introduced into the bed, the crosslinking agent, viscosifying agent and other materials which are desired to be deposited onto the deformable core are introduced, preferably simultaneously, or injected into the bed through different orifices. The deformable core is then coated with coating materials as the deformable core moves from the bottom of the bed and through the perforations. The coated deformable cores are then dried at a temperature between from about 120° F. to about 150° F. while air or gas is blown into the bed in a dehumidified state.

Alternatively, the deformable core may be slurried with the crosslinking agent and viscosifying agent, along with other materials desired to be deposited onto the deformable core, at ambient temperature and pressure. The slurry may then be subjected to an aqueous spray tower to remove the liquids.

The use of the coated deformable core described herein renders it unnecessary to separately ship core particulates, viscosifying agent, crosslinking agent, crosslinking delaying agent and other additives to a remote location. In addition, less platform space is needed on site to perform the well treatment operation since less space is needed for formulating the well treatment fluid.

The coated deformable cores may be prepared off-site and shipped to the treatment location where they could then be mixed with other components of the requisite well treatment composition, including the carrier fluid, when lost circulation occurs.

Suitable carrier fluids include salt water, fresh water, slickwater, liquid hydrocarbons, and/or nitrogen or other gases. The well treatment composite is preferably substantially neutrally buoyant in the carrier fluid. The composite may further be added to drilling fluids, well cements as well as completion brine.

Alternatively, the deformable cores could be mixed with the other well treatment agents described herein (which are not a component of the coating on the deformable core) off site and the mixture shipped to the treatment location where they could then be admixed with the carrier fluid and any other components defining the well treatment fluid on the fly as the need arises.

The pH of the carrier fluid may be adjusted if necessary prior to pumping the treatment fluid into the wellbore. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. Preferably, the pH is kept neutral or basic, i.e., from about 7 to about 14, more preferably between about 8 to about 12.

The density of the well treatment compositions of the invention may further be adjusted by use of one or more weight modifying agents. The amount of weight modifying agent in the composition is such as to impart to the composition a desired density. A weighting agent may be utilized to increase the density of the well treatment composition in order to maintain hydrostatic balance in the wellbore. A weight reducing agent may be used in order to provide a density to the well treatment composition which is lower than water. The weight modifying agents may be a cementitious material, sand, glass, hematite, silica, sand, fly ash, aluminosilicate, and an alkali metal salt or trimanganese tetra oxide. Further, the weight modifying agent may be a cation selected from alkali metal, alkaline earth metal, ammonium, manganese, iron, titanium and zinc and an anion selected from a halide, oxide, a carbonate, nitrate, sulfate, acetate and formate. For instance, the weight modifying agent may include calcium carbonate, potassium chloride, sodium chloride, sodium bromide, calcium chloride, barite (barium sulfate), hematite (iron oxide), ilmenite (iron titanium oxide), siderite (iron carbonate), manganese tetra oxide, calcium bromide, zinc bromide, zinc formate, zinc oxide or a mixture thereof. In a preferred embodiment, the weight modifying agent is selected from finely ground sand, glass powder, glass spheres, glass beads, glass bubbles, ground glass, borosilicate glass or fiberglass. Glass bubbles and pozzolan spheres are the preferred components for the weight reducing agent.

The loading of the composite in the pumpable carrier fluid is typically between from about 100 pounds to about 20,000 pounds of composite per 1,000 gallons of aqueous fluid. Typically, the well treatment composition contains between from about 1,000 pounds to about 10,000 pounds of composite per 1,000 gallons of aqueous fluid. The loading of composite in the pumpable well treatment composition is dependent on the severity of the fluid losses into the formation.

Typically, the viscosity of the well treatment composition is from about 500 to greater than or equal to 1,000,000 cP.

The well treatment fluid is pumped into the wellbore and the hardened materials which are coated on the deformable core begin to disassociate from the deformable core. As used herein, the term "pumped" encompasses pumping, injecting, pouring, releasing, displacing, spotting, circulating or otherwise placing a material within the well or wellbore using any suitable method known in the art.

After being introduced into the wellbore and, upon exposure to environmental conditions such as pH and elevated temperatures, the viscosifying agent (and optionally crosslinking agent, crosslinking delaying agent and other additives) disassociate from the deformable core. The viscosity of the well treatment fluid increases after the fluid is introduced into the wellbore and after the viscosifying agent begins to disassociate from the deformable core. In a similar manner, the crosslinking agent, delay agent, and other additives disassociate from the deformable core. As such, they become active components of the well treatment fluid after the treatment fluid has been introduced into the wellbore.

The well treatment composition flows into the flow passages where the plug or barrier is desired to be located. After formation of the plug or barrier, drilling, cementing, completion or workover may then be resumed and the loss of wellbore fluids into the formation is reduced or eliminated.

The well treatment composition introduced into the wellbore remains pumpable and, in a preferred embodiment, is pumped into the wellbore as a pill. The low viscosity of the well treatment composition facilitates ease in passage of the composition through a drill bit.

As the well treatment composition approaches the target area, the crosslinking agent and viscosifying agent becomes disassociated from the deformable core and reacts at or near the site of the fluid passageway which is desired to be plugged. The viscosity of the composition increases as the crosslinking reaction proceeds downhole. Other materials coated onto the deformable core also disassociate from the core once the particulate is within the targeted area of the wellbore or the subterranean formation. The increase in viscosity of the well treatment composition results in the formation of agglomerates which further thicken to form a plug or barrier. In most instances, an impermeable barrier or plug is formed within the formation or within the wellbore. Such barriers may be formed, for instance, in flow passages within the formation.

The formation of such barriers or plugs in the wellbore or in the formation enables a reduction of loss of fluid into the formation and/or reduces communication of fluids within the well. Further, the permeability of the formation, or fluid lost to flow channels is reduced or eliminated by the formation of the rigid barrier created by the well treatment composition. Improved isolation of flow of fluids to areas where flow is undesirable further allows for easier execution of subsurface operations, such as drilling and cementing.

The reduced loss of fluid into the formation, fracture or lower wellbore results from the formation of the thickened gel from the reaction of crosslinking agent and viscosifying agent. In some instances, the well treatment composition, after filling the voids in the reservoir, forms a dense filter cake under increased pressure as the composition dehydrates. In other instances, loss circulation may be combated merely by the viscosified well treatment composition (without the formation of a filter cake). This is especially the case in those instances where the formation is not permeable or exhibits low permeability, such as a shale formation.

The well treatment composition defined herein does not require additional bridging agents or materials or external activation, such as the introduction of an activator in the wellbore. The presence of such external activation measures often requires the use of additional workstrings or annular flow paths. Further, the well treatment composition defined herein is able to penetrate further into the loss zone than the LCMs of the prior art.

In contrast to conventional cement-containing LCMs, the well treatment composition defined herein further does not typically contain a cement. As such, it is not necessary to halt operations for extended periods of time in order for cement to set. When using the cement-containing LCMs of the prior art, the operation is typically required to stop operations for 4 to 8 hours while the cement sets. Since the well treatment composition defined herein is quick to react and set, downtime of the operation is greatly minimized. Thus, determining whether a given LCM will be suitable for a given operation requires dramatically less time with the well treatment composition defined herein in light of the ability of the composition to rapidly build viscosity.

Since the well treatment composition defined herein may provide extreme rigidity, it may be used to plug horizontal or deviated zones as well as stabilize a wellbore requiring an off-bottom liner or casing. In the latter, the well treatment composition may serve as a corner base for the cementitious slurry. When viscosified, the composition forms a downhole plug and renders unnecessary the need for a packer or other mechanical device. Thus, the plug may serve as a false bottom and render it unnecessary to run the liner to a greater depth. As a result, the plug composed of the viscosified well treatment composition is capable of keeping the open hole portion beneath the liner isolated.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

A well treating composite having a deformable core particulate and a hardened coating was prepared using, as particulate, LiteProp™ 125, commercially available from Baker Hughes Incorporated, by spraying and drying onto the particulate in sequential steps: (1) sodium carbonate, (2) sodium tetraborate and (3) guar. A volume of a base fluid (250 ml of 2% KCl) was measured in a beaker and added to a variable speed Waring blender. The desired mass of the untreated particulate and coated particulate was measured using a balance. The Waring blender was turned on and set to a mixing speed of 1,500 RPM and the desired mass of the untreated or treated particulate was added to the base fluid in the blender jar. The samples were mixed in the blender at 1,500 rpm for about 5 minutes, and then transferred to a vessel for viscosity measurement. The additives amounts deposited on the particulate were sufficient for a 4 pound per gallon loading of the composite to deliver 40 lb/Mgal of guar accompanied with the appropriate concentrations of crosslinker and buffer to generate a robust crosslinked fluid.

The viscosities of the slurry compositions were measured using a Brookfield LDV-III Viscometer equipped with a #3 LV CYL cylindrical spindle (Brookfield Engineering Laboratories, Middleboro, Mass.) at a rotational speed of 0.3 rpm, resulting in an apparent shear rate of 0.063 $\sec^{-1}$. Slurry viscosities greater than 2,000,000 cP exceed the measurement capabilities of the instrument using this spindle/rotational speed combination.

| Sample | Concentration | Viscosity @ 0.063 $\sec^{-1}$ at 5 min. |
|---|---|---|
| Treated Particulate | 2 ppg | 362,000 cP |
| Untreated Particulate | 4 ppg | 399.8 cP |
| Treated Particulate | 4 ppg | 804,000 cP |
| Untreated Particulate | 6 ppg | 799.8 cP |
| Treated Particulate | 6 ppg | >2,000,000 cP |
| Untreated Particulate | 8 ppg | 4800 cP |
| Treated Particulate | 8 ppg | >2,000,000 cP |

The low shear rate Brookfield viscosities of the slurry samples including the composites exhibited viscosities as much as 2,000 times greater the observed for slurries of the untreated particulate. The much greater viscosity of the fluid within the particulate pack pore spaces will impede flow of trailing fluids through the pack to a far greater degree than the lesser viscosity fluid.

Example 2

Two fluid loss tests were performed at 100° F. in a standard cell, as described in API Procedure 13N. A slurry comprised of 100 ml of 40 pound per thousand gallons linear guar gel and 96 gm of 20/40 sand was loaded into one cell. Into the other, an 8 pound per gallon slurry of the coated particulate prepared in Example 1 was mixed and loaded. Assembly was completed to seal both cells and 1,000 lbs of differential pressure was applied at the top cell valve. The top cell valves were opened and the cells were allowed fifteen minutes to equilibrate to the 100° F. test temperature. The bottom valves were then opened and the amount of fluid exiting the cell (the filtrate) was measured versus time.

Improved efficiency as a lost circulation control material may be evidenced by a reduction of the filtrate migrating through the particulate pack. Little to no control of leakoff was observed in the sand slurry test, as over 40 ml of filtrate were collected within the 36 minute test period. Approximately 0.6 ml of filtrate was collected from the cell with the viscosifying agent coated deformable particulate during the 36 minute test, with 0.3 ml of the total collected was interpreted as spurt loss as it appeared immediately upon opening of the bottom cell valve. The significant difference in the volumes of filtrate observed in this comparison is clear evidence of the utility of the viscosifying agent coated deformable particulate as a lost circulation material.

What is claimed is:

1. A method of treating a well in communication with a subterranean formation which comprises:
   (A) introducing into the well a pumpable well treatment fluid comprising (i) a composite of a deformable core coated with a crosslinkable viscosifying agent and a crosslinking agent, wherein the crosslinking agent reacts with the coated crosslinkable viscosifying agent after being introduced into the well and after disassociation of the crosslinkable viscosifying agent and crosslinking agent from the deformable core; and (ii) a carrier fluid;
   (B) disassociating the viscosifying agent and the crosslinking agent from the deformable core, increasing the viscosity of the well treatment fluid in-situ by disassociating the viscosifying agent and crosslinking agent from the deformable core and forming agglomerates of the deformable core after disassociation of the crosslinking agent and viscosifying agent; and
   (C) forming a barrier within the formation or within the wellbore from the agglomerates of deformable core
wherein the barrier causes at least one of the following conditions to result:
   (a) reduction in the permeability of the formation;
   (b) mitigation of fluid loss into the formation; or
   (c) reduction of fluid communication within the well and further wherein at least one of the following conditions prevail:
   (i) the amount of crosslinking agent coated onto the deformable core is between from 0.001 to 2 percent based on the total weight of the deformable core, viscosifying agent and crosslinking agent; or
   (ii) the amount of viscosifying agent coated onto the deformable core is between from about 0.1 to about 5 wt %, based on the total weight of deformable core and viscosifying agent.

2. The method of claim 1, wherein the deformable core is porous.

3. The method of claim 1, wherein the deformable core has an apparent specific gravity less than or equal to 2.45.

4. The method of claim 3, wherein the deformable core has an apparent specific gravity less than or equal to 2.0.

5. The method of claim 4, wherein the deformable core has an apparent specific gravity less than or equal to 1.75.

6. The method of claim 5, wherein the deformable core has an apparent specific gravity less than or equal to 1.25.

7. The method of claim 1, wherein the well treatment fluid is introduced into the well in the form of a loss circulation pill.

8. The method of claim 1, wherein the deformable core further has coated thereon a hardened crosslinking delaying agent.

9. The method of claim 1, wherein the well treatment fluid is prepared on the fly.

10. The method of claim 1, wherein the viscosifying agent is selected from the group consisting of cellulose, cellulosic derivatives, starch, galactomannans, xanthan, welan, succinoglycan, scleroglucan, diutan, underivatized galactomannan gums, derivatized galactomannan gums and homo-, block or random polymers containing vinyl alcohol, acrylate, pyrrolidone, 2-acrylamido-2-methylpropane sulfonate, or acrylamide units, and mixtures thereof.

11. The method of claim 10, wherein the viscosifying agent is selected from the group consisting of underivatized guar, derivatized guar, alkylcelluloses, hydroxyalkyl celluloses, alkylhydroxyalkyl celluloses, carboxyalkyl cellulose, and mixtures thereof.

12. The method of claim 11, wherein the viscosifying agent is a guar derivative selected from the group consisting of guar gum, carboxymethyl guar, carboxymethylhydroxypropyl guar, hydroxypropyl guar, and mixtures thereof.

13. The method of claim 1, wherein the crosslinking agent comprises at least one member selected from the group of borate releasers or an organometallic or organic complexed metal ion comprising at least one transition metal or alkaline earth metal ion.

14. The method of claim 1, wherein the deformable core is a natural product selected from chipped, ground or crushed nut shells, seed shells, fruit pits, processed wood at least partially coated or hardened with a protective coating or modifying agent, a furan, furfuryl, phenol formaldehyde, phenolic epoxy, melamine formaldehyde resin, urethane resin, polystyrene divinylbenzene, polystyrene/vinyl/divinyl benzene, acrylate-based terpolymer or a mixture thereof.

15. A method of treating a well in communication with a subterranean formation which comprises:
   (A) introducing into the well a pumpable well treatment fluid comprising (i) a composite of a deformable core coated with a viscosifying agent and a crosslinking agent; and (ii) a carrier fluid;
   (B) increasing the viscosity of the well treatment fluid in-situ by disassociating the viscosifying agent and crosslinking agent from the deformable core and reacting the viscosifying agent and crosslinking agent in proximity to a targeted area in the well; and
   (C) forming a barrier from the deformable core within the formation or within the well after disassociation of the viscosifying agent and crosslinking agent from the deformable core and after reaction of the viscosifying agent and crosslinking agent
wherein the barrier causes at least one of the following conditions to result:
   (a) reduction in the permeability of the formation;
   (b) mitigation of fluid loss into the formation; or
   (c) reduction of fluid communication within the well.

16. A method of isolating, plugging or impairing a flow passage of a permeable zone of a subterranean formation during the recovery of oil or gas from the subterranean formation, the method comprising:
   (a) introducing into the flow passage a pumpable well treatment fluid comprising a composite of a deformable core having coated thereon a viscosifying agent and a crosslinking agent, wherein the viscosifying agent is derivatized guar, underivatized guar or a combination thereof;

(b) increasing in-situ the viscosity of the well treatment composition by disassociating the viscosifying agent and crosslinking agent from the deformable core resulting in the formation of agglomerates of deformable core; and (c) forming a fluid impermeable barrier in or across the flow passage from the agglomerates wherein at least one of the following conditions prevail:

(i) the amount of crosslinking agent coated onto the deformable core is between from 0.001 to 2 percent based on the total weight of the deformable core, viscosifying agent and crosslinking agent; or (ii) the amount of viscosifying agent coated onto the deformable core is between from about 0.1 to about 5 wt %, based on the total weight of deformable core and viscosifying agent.

17. The method of claim 16, wherein the agglomerates of step (b) is a filter cake.

18. The method of claim 16, wherein the deformable core is porous.

19. The method of claim 16, wherein the well treatment fluid of step (a) is introduced into the well in the form of a loss circulation pill.

20. The method of claim 15, wherein the deformable core has an apparent specific gravity less than or equal to 2.45.

21. The method of claim 15, wherein the composite pumped into the well further comprises a crosslinking delaying agent coated onto the deformable core and further wherein the crosslinking delaying agent disassociates in-situ from the deformable core.

22. The method of claim 15, wherein (i) the amount of crosslinking agent coated onto the deformable core is between from 0.001 to 2 percent based on the total weight of the deformable core, viscosifying agent and crosslinking agent; (ii) the amount of viscosifying agent coated onto the deformable core is between from about 0.1 to about 5 wt %, based on the total weight of deformable core and viscosifying agent; or both (i) and (ii).

23. The method of claim 15, wherein the viscosifying agent is underivatized guar, derivative guar or a combination thereof.

24. The method of claim 23, wherein the crosslinking agent is a borate releasing compound.

25. A method of forming a fluid-impermeable barrier to the flow of fluids in a subterranean formation penetrated by an oil, gas or geothermal well, the method comprising:

(A) introducing into the well a treatment fluid comprising
(i) a composite of a deformable core having coated thereon a viscosifying agent and a crosslinking agent; and (ii) a carrier fluid;

(B) disassociating the viscosifying agent and crosslinking agent from the deformable core and forming a thickened gel by reacting the disassociated viscosifying agent and disassociated crosslinking agent;

(C) forming agglomerates of the deformable core after disassociation of the viscosifying agent and crosslinking agent; and (D) forming a fluid-impermeable barrier in the subterranean formation from the agglomerates of deformable core wherein the barrier causes at least one of the following conditions to result:

(a) reduction in the permeability of the formation;
(b) mitigation of fluid loss into the formation; or
(c) reduction of fluid communication within the well.

26. The method of claim 25, wherein the barrier is formed in fractures, vugs or high permeability zones within the formation.

27. The method of claim 15, wherein the well is treated in a drilling, completion or workover operation treatment and further wherein the well treatment fluid viscosifies after the viscosifying agent disassociates from the deformable core and prior to re-starting of the drilling, completion or workover operation.

28. The method of claim 15, wherein the particle size of the deformable core is between from about 4 mesh to about 500 mesh.

29. The method of claim 1, wherein the crosslinkable viscosifying agent, crosslinking agent or both the crosslinkable viscosifying agent and crosslinking agent of the composite are hardened onto the deformable core.

30. The method of claim 25, wherein the particle size of the deformable core forming the fluid-impermeable barrier is from about 4 mesh to about 500 mesh.

* * * * *